United States Patent
Eagleton et al.

(10) Patent No.: US 10,800,058 B2
(45) Date of Patent: Oct. 13, 2020

(54) METHOD OF MANUFACTURING A LIQUID DISPENSING SHAVING RAZOR

(71) Applicant: The Gillette Company LLC, Boston, MA (US)

(72) Inventors: Christopher Raymond Eagleton, Devizes (GB); Kelly Daniel Bridges, Randolph, MA (US)

(73) Assignee: The Gillette Company LLC, Boston, MA (US)

( * ) Notice: Subject to any disclaimer, the term of this patent is extended or adjusted under 35 U.S.C. 154(b) by 0 days.

(21) Appl. No.: 15/812,306

(22) Filed: Nov. 14, 2017

(65) Prior Publication Data

US 2018/0200899 A1 Jul. 19, 2018

Related U.S. Application Data

(60) Provisional application No. 62/447,074, filed on Jan. 17, 2017.

(51) Int. Cl.
| | |
|---|---|
| *B26B 21/44* | (2006.01) |
| *B26B 21/52* | (2006.01) |
| *B29C 69/00* | (2006.01) |
| *B29L 31/00* | (2006.01) |
| *B26B 21/06* | (2006.01) |
| *B26B 21/22* | (2006.01) |

(52) U.S. Cl.
CPC .......... *B26B 21/446* (2013.01); *B26B 21/521* (2013.01); *B26B 21/522* (2013.01); *B26B 21/528* (2013.01); *B29C 69/00* (2013.01); *B26B 21/06* (2013.01); *B26B 21/225* (2013.01); *B29L 2031/7186* (2013.01)

(58) Field of Classification Search
CPC ..... B26B 21/40; B26B 21/446; B26B 21/528; B29C 69/00
USPC ............................. 30/41, 41.5, 535
See application file for complete search history.

(56) References Cited

U.S. PATENT DOCUMENTS

| | | | | |
|---|---|---|---|---|
| 4,129,942 A | * | 12/1978 | Denizman | ............. B26B 21/446 30/41 |
| 4,635,361 A | * | 1/1987 | DeMars | ................ B26B 21/446 30/41 |

(Continued)

FOREIGN PATENT DOCUMENTS

| | | | | |
|---|---|---|---|---|
| DE | 29711818 U1 | * | 9/1997 | ........... B26B 21/446 |
| DE | 102012018501 A1 | * | 3/2014 | ........... B26B 21/446 |

(Continued)

OTHER PUBLICATIONS

PCT International Search Report with Written Opinion in corresponding Int'l application PCT/US2018/012145 dated Apr. 20, 2018.

*Primary Examiner* — Jason Daniel Prone
(74) *Attorney, Agent, or Firm* — John M. Lipchitz

(57) ABSTRACT

A method of manufacturing a liquid dispensing razor by injection molding a gripping sleeve. A fluid reservoir having a port is blow molded. The fluid reservoir is inserted into the gripping sleeve. A handle body is injection molded. A shaving razor cartridge is mounted to the handle body. The gripping sleeve is joined to the fluid reservoir. The gripping sleeve is attached to the handle body. An air gap is provided between the gripping sleeve and the fluid reservoir facilitating evacuation of the delaminating bottle during use.

3 Claims, 4 Drawing Sheets

(56) References Cited

U.S. PATENT DOCUMENTS

| | | | | |
|---|---|---|---|---|
| 4,653,188 | A * | 3/1987 | Kwak | B26B 21/446 30/41 |
| 4,753,006 | A * | 6/1988 | Howe | B26B 21/446 30/41 |
| 4,760,642 | A * | 8/1988 | Kwak | A46B 11/0024 30/41 |
| 4,800,649 | A * | 1/1989 | Cataudella | B26B 21/446 30/41 |
| 4,858,314 | A * | 8/1989 | Cunningham | B26B 21/446 30/41 |
| 5,337,478 | A * | 8/1994 | Cohen | B26B 21/446 30/41 |
| 5,402,573 | A * | 4/1995 | Laniado | B26B 21/446 30/41 |
| 5,673,485 | A * | 10/1997 | Hill | B26B 21/446 30/41.5 |
| 5,784,790 | A | 7/1998 | Carson, III et al. | |
| 6,754,958 | B2 * | 6/2004 | Haws | B26B 21/446 30/41 |
| 6,925,716 | B2 * | 8/2005 | Bressler | B26B 21/44 30/41 |
| 6,964,097 | B2 * | 11/2005 | Franzini | B26B 21/44 30/41 |
| 7,814,661 | B2 | 10/2010 | Tomassetti | |
| 8,793,879 | B2 | 8/2014 | Jessemey et al. | |
| 8,826,543 | B2 * | 9/2014 | Szczepanowski | B26B 21/446 30/41 |
| 8,887,369 | B2 * | 11/2014 | Burrowes | B26B 21/446 30/41 |
| 8,931,177 | B2 * | 1/2015 | Wain | B26B 21/446 30/41 |
| 9,216,514 | B2 * | 12/2015 | Bridges | B26B 21/446 |
| 9,643,327 | B2 * | 5/2017 | Stevens | B26B 21/40 |
| 9,656,401 | B2 | 5/2017 | Burrowes et al. | |
| 9,789,620 | B2 * | 10/2017 | Wain | B26B 21/446 |
| 9,833,916 | B2 * | 12/2017 | Shorey | B26B 21/44 |
| 10,035,275 | B2 * | 7/2018 | Hawes | B26B 19/40 |
| 2005/0132574 | A1 | 6/2005 | Tomassetti | |
| 2006/0272154 | A1 * | 12/2006 | Brevard | B26B 21/446 30/41 |
| 2007/0017098 | A1 * | 1/2007 | Bressler | B26B 19/40 30/41 |
| 2008/0307660 | A1 | 12/2008 | Clarke | |
| 2009/0183371 | A1 * | 7/2009 | Mileti | B26B 21/446 30/41.5 |
| 2010/0175261 | A1 * | 7/2010 | Lax | B26B 21/22 30/41 |
| 2012/0102744 | A1 | 5/2012 | Forsdike et al. | |
| 2013/0145601 | A1 | 6/2013 | Burrowes et al. | |
| 2015/0121704 | A1 | 5/2015 | Bridges et al. | |
| 2017/0001320 | A1 * | 1/2017 | Hodgson | B26B 21/446 |
| 2017/0001322 | A1 * | 1/2017 | Shorey | B26B 21/446 |
| 2017/0266827 | A1 * | 9/2017 | Moretti | B26B 21/522 |
| 2018/0009122 | A1 * | 1/2018 | Bruce | B26B 21/225 |
| 2018/0200900 | A1 * | 7/2018 | Eagleton | A45D 34/00 |

FOREIGN PATENT DOCUMENTS

| | | | | |
|---|---|---|---|---|
| GB | 2342290 A | * | 4/2000 | B26B 21/446 |
| GB | 2402096 A | * | 12/2004 | B26B 21/446 |
| KR | 20120115308 A | * | 10/2012 | B26B 21/446 |
| WO | WO-2008152601 A1 | * | 12/2008 | B26B 21/446 |
| WO | WO-2014069806 A1 | * | 5/2014 | B26B 21/06 |
| WO | WO-2018136228 A1 | * | 7/2018 | B26B 21/521 |
| WO | WO-2018136229 A1 | * | 7/2018 | A45D 34/00 |

* cited by examiner

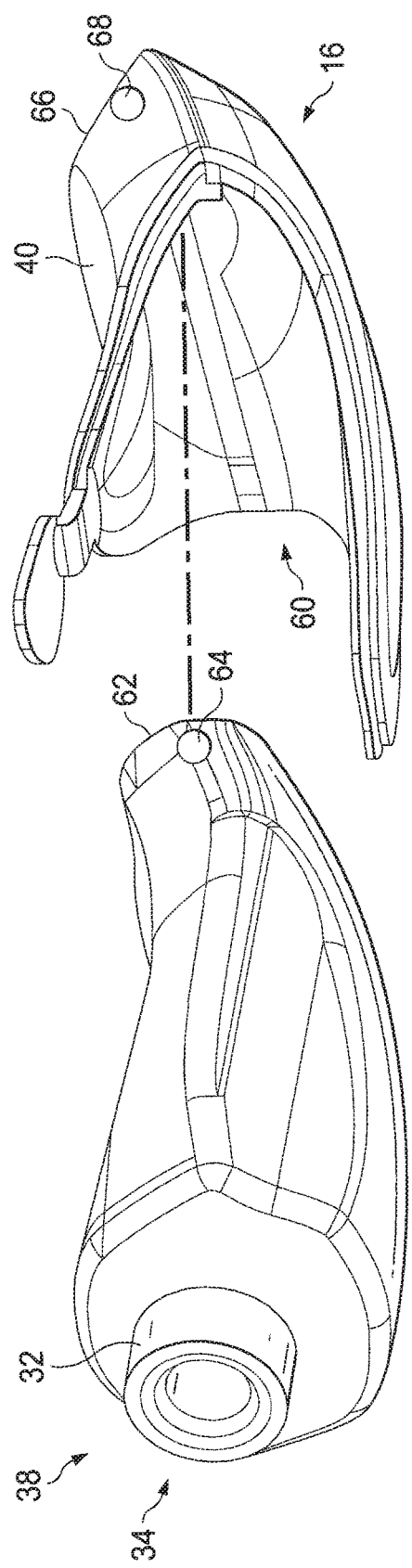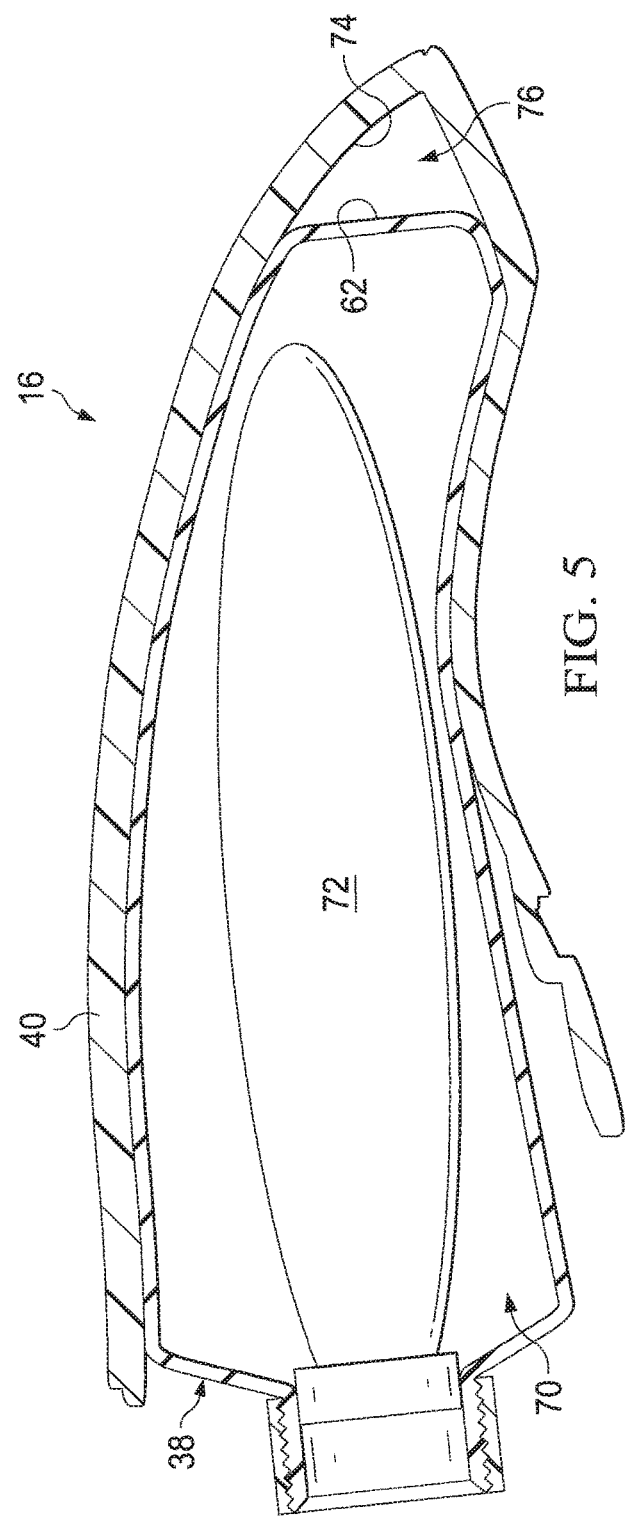

METHOD OF MANUFACTURING A LIQUID DISPENSING SHAVING RAZOR

FIELD OF THE INVENTION

The present invention relates to liquid dispensing shaving razors in general, and, more particularly, to personal care bottles for liquid dispensing shaving razors.

BACKGROUND OF THE INVENTION

Skin care can be of particular importance in improving or enhancing the appearance of men and women. Various products and methods can be used to care for skin. For example, exfoliant scrubs, cleansers, and lotions are sometimes used to maintain healthy-looking skin. Exfoliant scrubs can be used to remove dead skin cells from the surface of the skin, which can give the skin an improved tone. Soaps and other cleansers can be used to remove dirt and excess oil from the skin, which can help prevent clogging of pores. Consequently, acne and other types of skin blemishes can be prevented in some cases. Lotions and various other topical ointments can also be used to deliver nutrients and/or moisturizers to the skin in an effort to improve the appearance and/or the health of the skin. Other types of cosmetic products (e.g., creams and lotions) or drug actives are sometimes used in an attempt to eliminate wrinkling and other signs of aging.

It is generally known that the process of shaving the skin may provide certain skin benefits such as exfoliation and hydration. In general, shaving razors of the wet shave type include a cartridge or blade unit with at least one blade with a cutting edge which is moved across the surface of the skin being shaved by means of a handle to which the cartridge is attached; however, razor assemblies may also include electric foil type shavers. The cartridge may be mounted detachably on the handle to enable the cartridge to be replaced by a fresh cartridge when the blade sharpness has diminished to an unsatisfactory level, or it may be attached permanently to the handle with the intention that the entire razor be discarded when the blade or blades have become dulled (i.e., disposable razor). The connection of the cartridge to the handle provides a pivotal mounting of the cartridge with respect to the handle so that the cartridge angle adjusts to follow the contours of the surface being shaved. In such systems, the cartridge can be biased toward a rest position by the action of a spring-biased plunger (a cam follower) carried on the handle against a cam surface on the cartridge housing.

The shaving process typically includes the application of a shaving aid material (e.g., shaving cream) to the surface and the separate step of shaving the hair using a razor assembly. The shaving aid material often times includes at least one suitable agent (e.g., a lubricating agent, a drag-reducing agent, a depilatory agent, etc.) that enhances the shaving process. Most consumers find this type of preparation to be rather inconvenient because of the need for multiple shaving products, e.g., a wet shaving razor and a skin preparation product, as well as the undesirable necessity for multiple application steps during the wet shaving process. Furthermore, this process can be messy and requires the consumer rinse their hands after applying the shave gel. This multi-step process also results in an overall extended shaving experience which most consumers do not prefer given typical morning hygiene routines. It may, however, be desirable sometimes to apply liquids of other kinds to the skin before, during, or after shaving. It has been found that especially in the case of males who shave facial hair, it is important to provide a shave preparation of some sort prior to shaving in order to adequately hydrate the coarser facial hairs to allow for an easier and closer shave.

In the past, there have been a number of wet shaving product configurations that include a system for conveying a shaving preparation during shaving, e.g. a lubricating liquid, from a reservoir incorporated in the razor structure in the form of a hollowed-out razor handle or even an aerosol can that acts as a razor handle, to a dispensing location near the head of the razor. A number of more recent wet shaving razors have cartridges that are movably mounted, in particular pivotable, relative to the handle structures on which they are mounted either permanently, in the case of disposable safety razors intended to be discarded when the blade or blades have become dulled, or detachably to allow replacement of the blade unit on a reusable handle structure. Many of these types of razors that are capable of conveying a liquid to the skin surface are unfortunately plagued by a number of problems. For instance, the bottles often lack functionality other than storing and transferring a liquid. Accordingly, the functionality, such as securing the bottle in place properly must be provided by the handle, which may not be intuitive and may require the use of both hands. Furthermore, a delaminating bag inside a bottle is often used for delivering a liquid in association with a pump, but these designs are also limited because of the current manufacturing processes. Accordingly, it is difficult to incorporate various design features into the bottle.

SUMMARY OF THE INVENTION

In one aspect, the invention features, in general, a liquid dispensing shaving razor having a handle body defining an opening. A shaving razor cartridge is mounted to a proximal end of the handle body. A personal care bottle is mounted to a distal end of the handle body and in fluid communication with the shaving razor cartridge. The personal care bottle has a locking tab removably positioned within the opening of the handle body securing the personal care bottle to the handle body.

In another aspect, the invention features, in general, a liquid dispensing shaving razor having a handle body. A shaving razor cartridge mounted to a proximal end of the handle body. A fluid reservoir having a delaminating bottle containing a liquid composition is joined to a gripping sleeve. The fluid reservoir is spaced apart from the gripping sleeve to define an air gap facilitating evacuation of the delaminating bottle.

In another aspect, the invention features, in general, a method of manufacturing a liquid dispensing razor by injection molding a gripping sleeve having a locking tab. A fluid reservoir having a fluid port is blow molded. The fluid reservoir is mounted to the gripping sleeve. A handle body is injection molded to define an opening dimensioned to receive the locking tab. A shaving razor cartridge is mount to the handle body. The gripping sleeve is removably attached to the handle body by engaging the locking tab within the opening. Certain embodiments may optionally include spacing the locking tab apart from the fluid reservoir wherein the locking tab is unsupported.

In another aspect, the invention features, in general, a method of manufacturing a liquid dispensing razor by injection molding a gripping sleeve. A fluid reservoir having a port is blow molded. The fluid reservoir is inserted into the gripping sleeve. A handle body is injection molded and a shaving razor cartridge is mounted to the handle body. The fluid reservoir is joined to the gripping sleeve. The gripping sleeve is attached to the handle body. An air gap is provided between the gripping sleeve and the fluid reservoir facilitating evacuation of the delaminating bottle during use.

The details of one or more embodiments of the invention are set forth in the accompanying drawings and the description below. Other features and advantages of the invention will be apparent from the description and drawings, and from the claims.

BRIEF DESCRIPTION OF THE DRAWINGS

FIG. 4 is a perspective assembly view of the personal care bottle of FIG. 3.

FIG. 5 is a cross section view of the personal care bottle of FIG. 2.

DETAILED DESCRIPTION OF THE INVENTION

Figure 1:
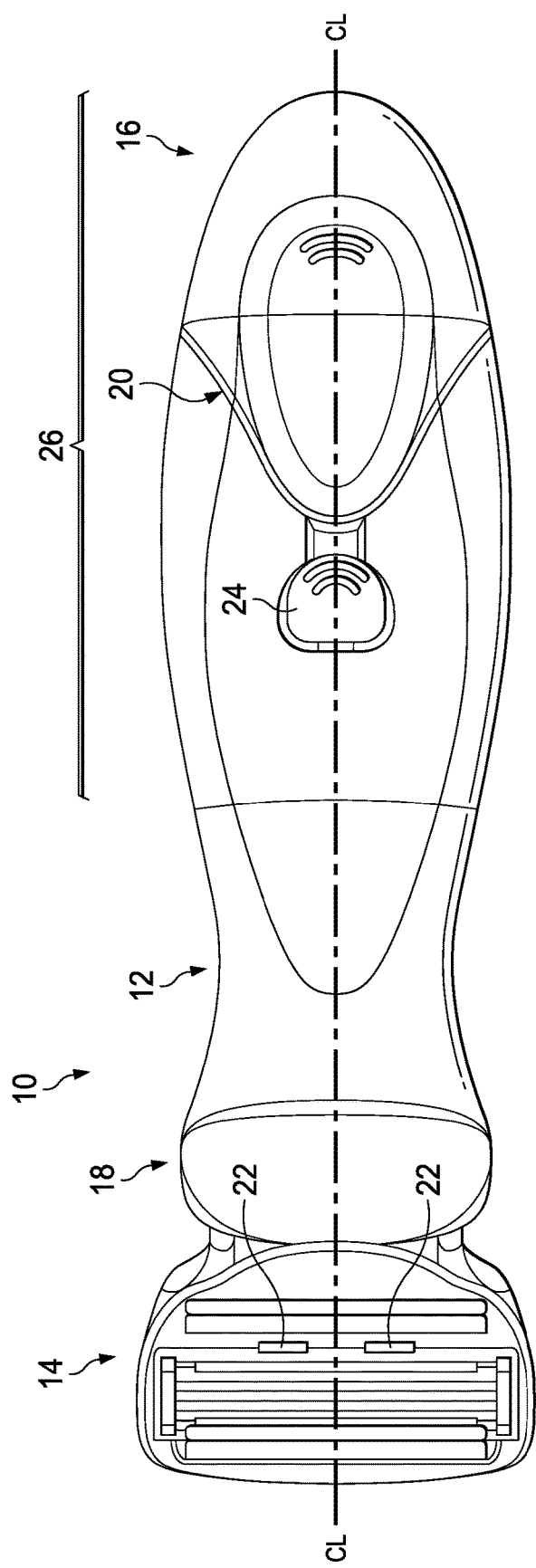
FIG. 1 is a top view of one possible embodiment of a liquid dispensing razor.

The present disclosure is not limited to wet shaving razors, or even razors in general. It is understood that certain aspects of the present disclosure may also be used for dry electric shaving razors that have one or more rotating or reciprocating blades or other personal care appliances (e.g., toothbrushes, depilatory applicators, epilators, or other beauty applicators). Furthermore, it is understood that certain aspects of the present disclosure may be used independently of applying a liquid (e.g., a cartridge and a dispensing unit 150 may be used independently).

The present disclosure is not limited to shaving cartridges in which the blades are rigidly mounted in a fixed position relative to a guard and/or a cap. If the blades are capable of movement, then the geometric parameters stipulated herein are those which apply when the blades are in their normal rest positions. Each of the illustrated safety razor blade units are intended to be mounted on a razor handle. The blade unit may be permanently attached to the handle, e.g., in a disposable razor, or may be formed as a cartridge adapted to be mounted releasably to the handle. The blade unit may be pivotally mounted to the handle or may be fixedly attached to the handle.

One or more blades may be mounted to a housing. The term "mounted to" may be defined as any of the following disclosed herein. The cutting blade may be supported firmly by the housing to remain substantially fixed in the positions in which they are depicted (subject to any resilient deformation which the blades undergo under the forces applied against the blades during shaving). Alternatively, the blades may be supported for limited movement against spring restoring forces, e.g., in a downward direction as viewed in the drawings. The basic construction and assembly of the blade units may be conventional.

Referring to FIG. 1 a top view of one possible embodiment of a liquid dispensing razor 10 is shown. The liquid dispensing razor 10 may include a handle body 12, a shaving razor cartridge 14, and a personal care bottle 16. It is understood that the shaving razor cartridge 14 may include other personal care instruments, such as toothbrushes. The shaving razor cartridge 14 may be mounted to a first end 18 of the handle body 12. In certain embodiments, the shaving razor cartridge 14 may be pivotally and/or removably mounted to the handle body 12. As will be explained in greater detail below, the personal care bottle 16 may be removably mounted to a distal end 20 of the handle body 12 (e.g., opposite the shaving razor cartridge 14). The personal care bottle 16 may contain a liquid reservoir (not shown) in communication with one or more ports 22 of the shaving razor cartridge 14 to aid in the shaving process. The personal care bottle 16 may have a locking tab 24 to secure the personal care bottle 16 to the handle body 12. The locking tab 24 may be positioned along a center line "CL" of the personal care bottle 16 to improve stability and security. The locking tab 24 may allow for quick and easy removal and replacement of the personal care bottle 16. In certain embodiments, the personal care bottle 16 may form a substantial part of a gripping region 26 of the liquid dispensing razor 10.

Figure 2:
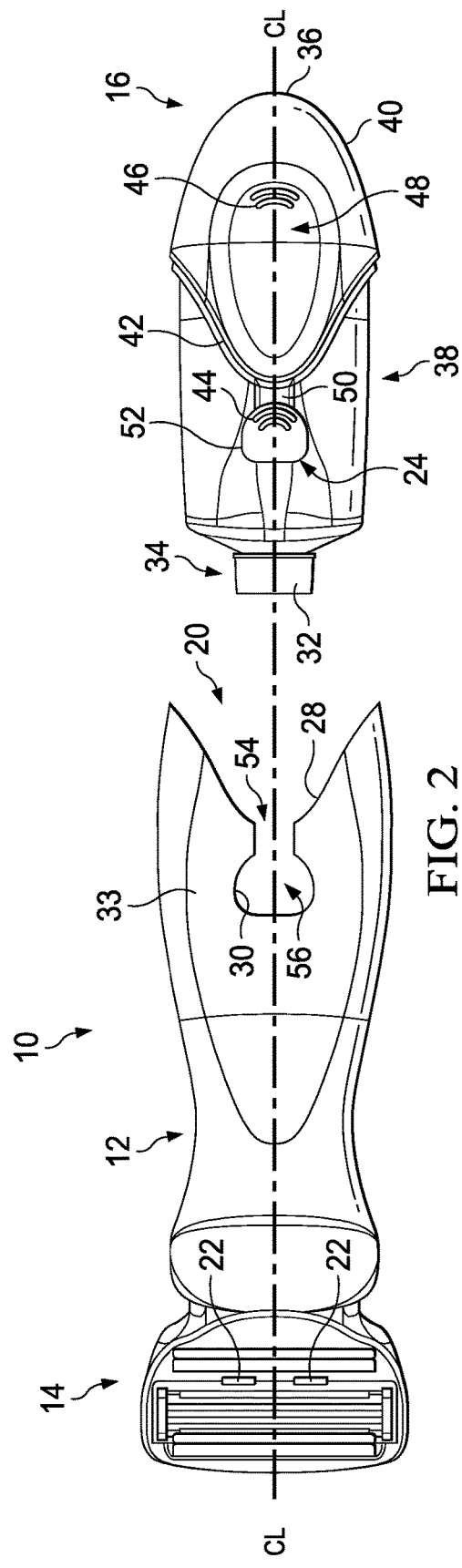
FIG. 2 is a top view of a handle and personal care bottle of the liquid dispensing razor of FIG. 1.

FIG. 2 is a top view of the liquid dispensing razor 10 is illustrated with the personal care bottle 16 removed from the handle body 12. In certain embodiments, the distal end 20 of the handle body 12 may have a concave form 28 configured to receive a corresponding end of the personal care bottle 16. The distal end 20 of the handle body 12 may define an opening 30 dimensioned to receive the locking tab 24 to secure the personal care bottle 16 to the handle body 12. The opening 30 may be positioned on an outer surface 33 of the handle body 12. The opening 30 on the outer surface 33 may provide for an intuitive feature for signaling the consumer how to remove the personal care bottle 16. For example, if the locking features were located inside the handle body 12, a consumer may not readily understand how to remove the personal care bottle 16.

The personal care bottle 16 may have a fluid port 32 for facilitating delivery of liquid to the one or more ports 22 of the shaving razor cartridge 14. The fluid port 32 may be located at a proximal end 34 of the personal care bottle 16. The locking tab 24 may be spaced apart from the fluid port 32. For example, the locking tab 24 may be positioned between a distal end 36 of the personal care bottle 16 and the fluid port 32. The personal care bottle 16 may include a fluid reservoir 38 containing a liquid composition, such as a shaving aid. A gripping sleeve 40 may be mounted over the fluid reservoir 38. In certain embodiments, the handle body 12 and the personal care bottle 16 may have corresponding mating portions. For example, the concave form 28 of the distal end 20 of the handle body 12 may engage a convex end portion 42 of the gripping sleeve 40. The engagement of the concave form 28 and the convex end portion 42 may facilitate securing the personal care bottle 16 and the handle body 12 by resisting twisting forces. The locking tab 24 may extend from the convex end portion 42 of the gripping sleeve 40, to provide a gradual, intuitive lead in for the locking tab 24 into the opening 30

The gripping sleeve 40 and the fluid reservoir 38 may be made using two different manufacturing methods to allow for different shapes having different functionality. For example, the fluid reservoir 38 may be blow molded and the gripping sleeve 40 may be injection molded. Blow molding may allow for the manufacture of a liquid container and the injection molding process may provide for various gripping features and the locking tab 24. The locking tab 24 may have at least one gripping member 44, such as a curved rib. The at least one gripping member 44 may provide a tactile and visual indication to a consumer to disengage the locking tab 24 to remove the personal care bottle 16 from the handle body 12. The gripping sleeve 40 may have other gripping members 46 to aid in removal of the personal care bottle 16. The gripping sleeve 40 may have a recessed top surface 48 between the locking tab 24 and the distal end 36. The gripping sleeve 40 may form the distal end 36 of the personal care bottle 16. The gripping member 46 may be positioned within the recess to provide an ergonomic grip grasp for a consumer. The locking tab 24 may have a land 50 extending from the gripping sleeve 40 and an enlarged end 52. The opening 30 may include a slot 54 that leads into a larger open region 56.

The locking tab 24 may have a first position with the enlarged end 52 positioned within the open region 56 and the land 50 positioned within the slot 54 (e.g., as shown in FIG. 2). A consumer may depress the enlarged end 52 and slide the personal care bottle 16 away from the handle body 12 to disengage the locking tab 24 from the open region 56. The enlarged end 52 may be larger than the slot 54 to allow the enlarged end 52 to slide under the slot 54 as the personal care bottle 16 is detached. A consumer may secure the personal care bottle 16 to the handle body 12 by sliding the enlarged end 52 over or on top of the slot 54. The enlarged end 52 may then drop into and engage the open region 52 to secure the locking tab 24 in place.

Figure 3:
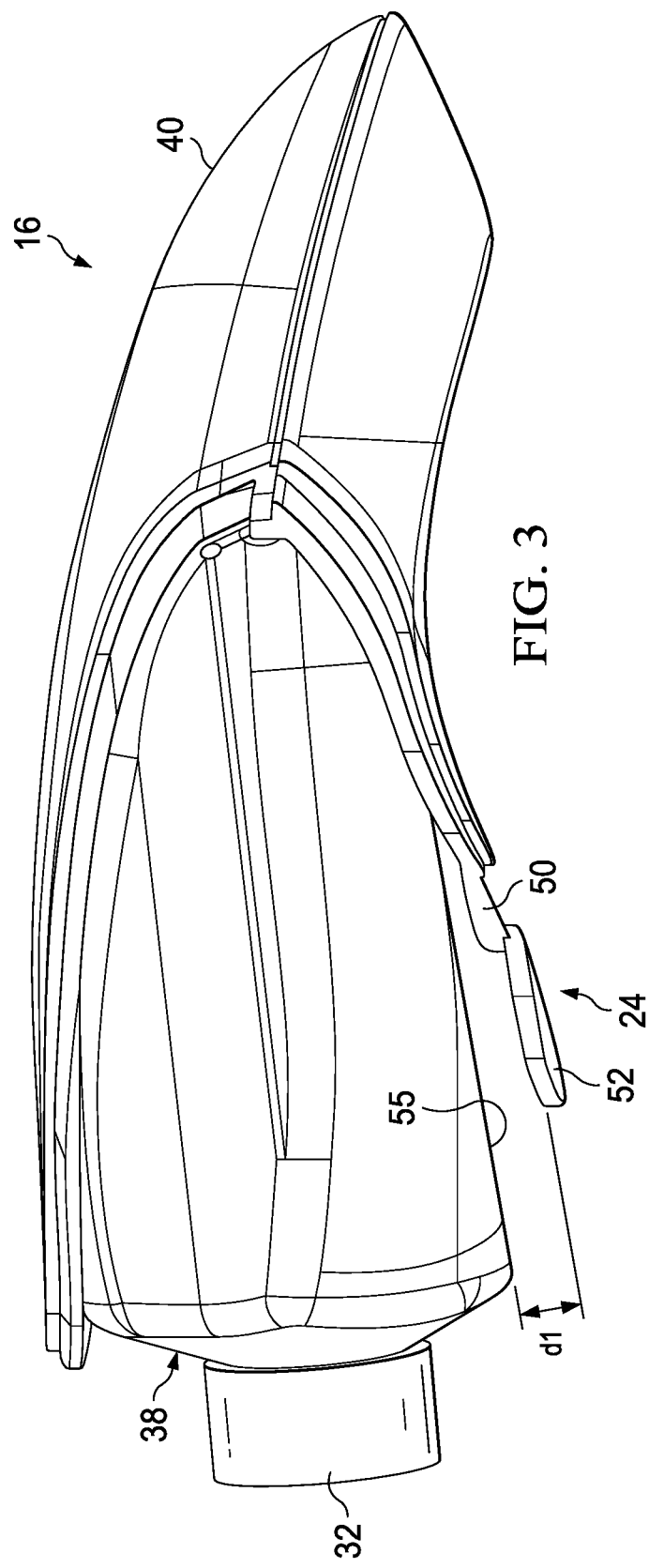
FIG. 3 is a side view of the personal care bottle of FIG. 2.

Referring to FIG. 3, a side view of the personal care bottle 16 is shown. The gripping sleeve 40 of the personal care bottle 16 may have an outer rim with a shoulder that is positioned beneath the handle body 12 of FIG. 2. The locking tab 24 may be unsupported and have a bottom surface spaced apart from the fluid reservoir 38, thus allowing the locking tab 24 to deflect during attachment and removal with the handle body 12 of FIGS. 1 and 2. In certain embodiments, the locking tab 24 may be stepped (e.g., the land 50 may be positioned closer to the fluid reservoir 38 than the enlarged end 52). The enlarged end 52 may be spaced apart from the fluid reservoir 38 (i.e., an outer surface 55 of the fluid reservoir 38) by a distance "d1" of about 0.5 mm to about 3 mm. Accordingly, the locking tab 24 may deflect, acting as a cantilever beam during attachment and removal of the personal care bottle 16. The locking tab 24 may be spaced apart from the fluid port 32 to separate the locking functionality with the fluid delivery functionality of the personal care bottle 16. A locking feature that is integrated with the fluid port may put stress on the fluid port, potentially damaging the fluid delivery mechanism. In addition, locking mechanisms may be difficult to design into a fluid port, for example, due to various design limitations of blow molding.

Referring to FIG. 4 is a perspective assembly view of the personal care bottle 16 of FIG. 3 is shown. The gripping sleeve 40 may define a cavity 60 dimensioned to receive a distal end 62 of the fluid reservoir 38. The fluid reservoir 38 may define an air hole 64 toward the distal end 62. As will be described in greater detail below, the fluid reservoir 38 may comprise a delaminating bag 72 that requires sufficient air to evacuate properly to remove liquid contained in the delaminating bag. The gripping sleeve 40 may cover up the air hole 64, thus preventing sufficient evacuation. Accordingly, a distal end portion 66 of the gripping sleeve 40 may define an air hole 68 that is in communication with the air hole 62 to allow evacuation of the delaminating bag 72. The positioning of the air holes 62 and 68 opposite the fluid port 32 at the proximal end 34 of the fluid reservoir 38 may improve the evacuation of the delaminating bag 72.

Referring to FIG. 5, a cross section view of the personal care bottle 16 of FIG. 3 is shown. The fluid reservoir 38 may define a chamber 70 configured to contain a delaminating bag 72. The delaminating bag 72 may contain a liquid composition, such as a shave prep or moisturizer. The distal end 62 of the fluid reservoir 38 may be spaced apart from a distal end inner surface 74 of the gripping sleeve 40 to provide an air gap 76 to facilitate the evacuation of the delaminating bag 72. It is understood the personal care bottle 16 may include the air gap 76 and/or the air hole 68 (FIG. 4) to facilitate evacuation of the delaminating bag 72.

Figure 6:
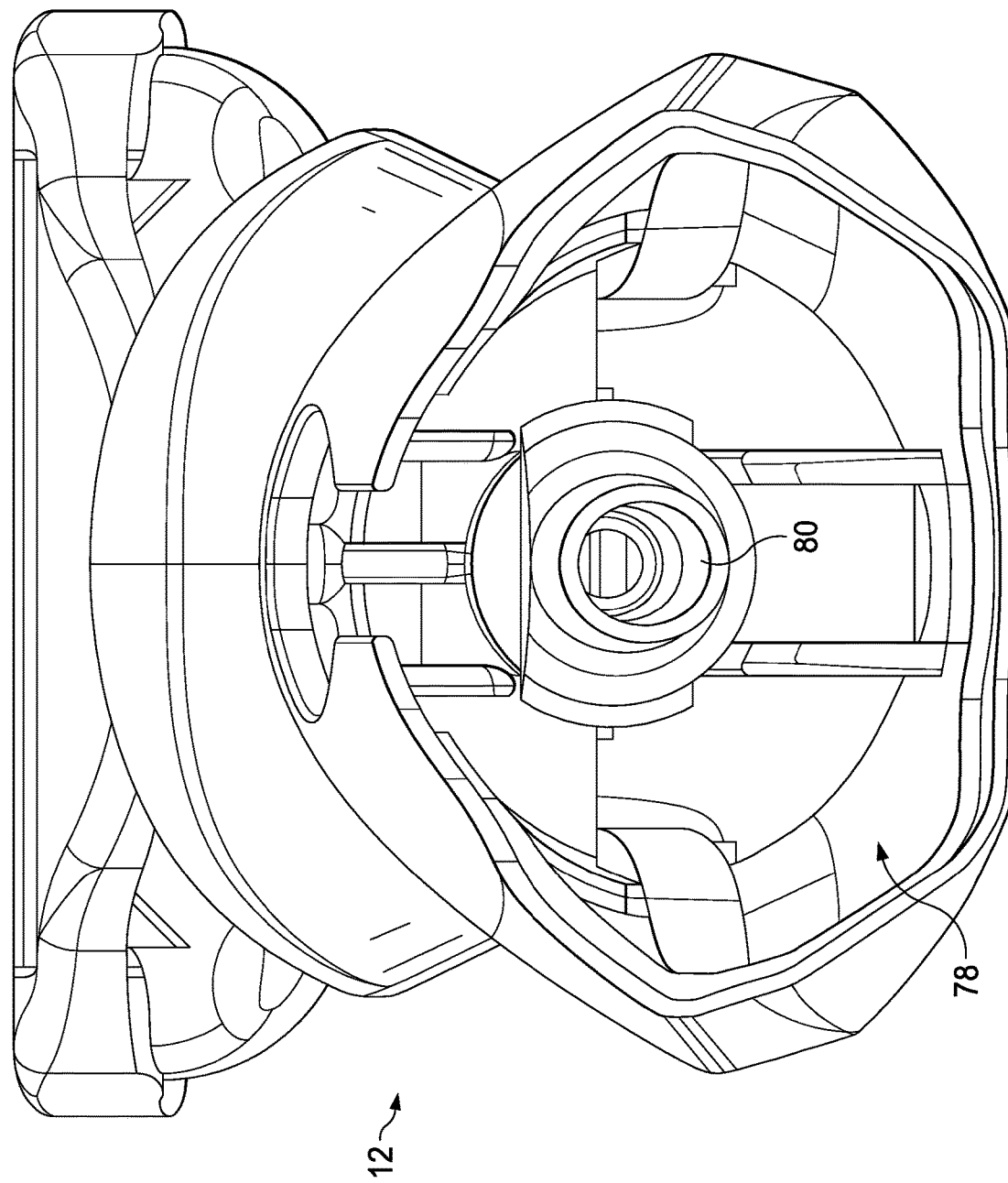
FIG. 6 is an end view of a handle body of the liquid dispensing razor of FIG. 1.

Referring to FIG. 6, an end view of the handle body 12 is shown. The handle body 12 may define a cavity 78 dimensioned to receive at least a portion of the personal care bottle 16. For example, the fluid port 32 (FIG. 2) may be positioned within the cavity 78 to engage a conduit 80 that facilitates delivery of liquid to the ports 22 of the shaving razor cartridge 14 (FIG. 2).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm." Furthermore, dimensions should not be held to an impossibly high standard of metaphysical identity that does not allow for discrepancies due to typical manufacturing tolerances. Therefore, the term "about" should be interpreted as being within typical manufacturing tolerances.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of manufacturing a liquid dispensing razor comprising:
   injection molding a gripping sleeve;
   blow molding a fluid reservoir having a delaminating bag and a port;
   inserting the fluid reservoir into the gripping sleeve to create an air gap between the gripping sleeve and the fluid reservoir;
   injection molding a handle body;
   mounting a shaving razor cartridge to the handle body;
   joining the gripping sleeve to the fluid reservoir; and
   attaching the gripping sleeve to the handle body.

2. The method of claim 1 further comprising filling the delaminating bag with a liquid composition.

3. The method of claim 2 further comprising providing an air hole extending into the fluid reservoir on an opposite end as the port.

* * * * *